Aug. 11, 1925.

E. R. DAVIS 1,548,871

CALF WEANER

Filed Oct. 17, 1924

Inventor
E. R. Davis.
By
Attorney

Patented Aug. 11, 1925.

1,548,871

UNITED STATES PATENT OFFICE.

ELISHA R. DAVIS, OF HAZARD, NEBRASKA.

CALF WEANER.

Application filed October 17, 1924. Serial No. 744,273.

*To all whom it may concern:*

Be it known that I, ELISHA R. DAVIS, a citizen of the United States, residing at Hazard, in the county of Sherman and State of Nebraska, have invented new and useful Improvements in Calf Weaners, of which the following is a specification.

This invention relates to calf weaners.

One object of the invention is to provide a device in the form of a muzzle which may be readily and quickly applied to the septum of the nose of the animal to effectively accomplish weaning and yet permit the animal to get its mouth to the ground and permit it to nibble the grass.

Another object resides in the provision of a simple, inexpensive, durable and efficient weaning device which may be easily and readily applied or removed and comfortably worn by the calf for the purposes of weaning the calf and yet permitting it to nibble the grass.

With the above and other objects in view, the invention consists in the construction and novel combination and arrangement of parts hereinafter fully described, illustrated in the accompanying drawings and pointed out in the claims hereto appended, it being understood that various changes in the form, proportion and minor details of construction, within the scope of the claims, may be resorted to without departing from the spirit or sacrificing any of the advantages of the invention.

Figure 1:
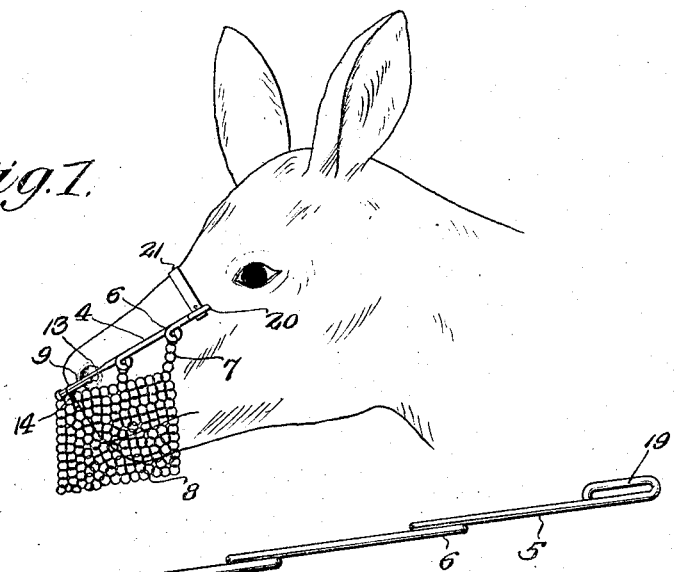
Figure 1 is a side elevation showing its application in use.
Figure 2:
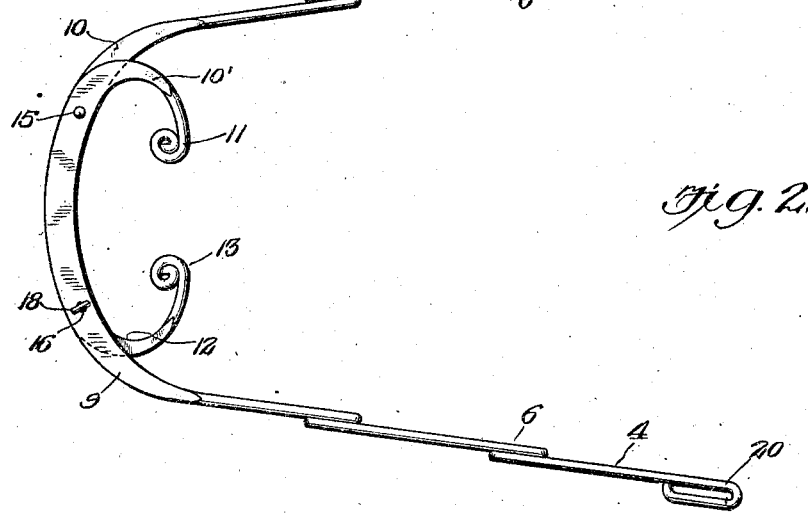
Figure 2 is a top plan view of the invention unapplied.
Figure 3:
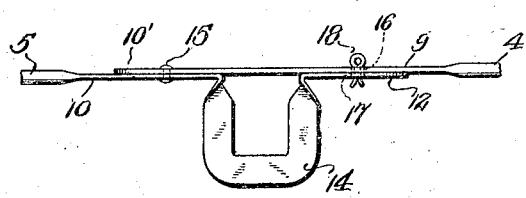
Figure 3 is a detail perspective view of the device unapplied.

Referring now more particularly to the accompanying drawings, the reference characters 4 and 5 indicate side bars of metal which, while more or less stiff are yieldable and it will be understood that other suitable material may be employed. These bars are adapted to extend along the sides of the mouth or head of the calf and if desired, the bars 4 and 5 may be twisted or otherwise provided with eyes 6, to which edge rings or links 7 of a wire mesh material 8 may be secured.

The bars 4 and 5 have their outer ends preferably flattened, as at 9 and 10 respectively and directed toward each other into overlapping relation. The inner end of the flattened portion 9 of the side bar 4 terminates in an arcuate shaped arm 10, provided at its inner extremity with a nostril engaging knob 11. The inner end of the side bar 5 terminates in an arcuate shaped arm 12 provided at its inner extremity with a nostril engaging knob 13. The flattened portion 10 of the arm 5 is directed downwardly to form a substantially U-shaped projection 14, which lies in front of the nostril engaging knobs 11 and 13 and in a vertical plane with relation to the overlapping portions of the bars and is designed to extend over the upper lip of the animal. The projection 14 is preferably twisted at the outer ends of the legs of the U-shaped projection so as to present flat rather than edge sides of the projection to the animal's upper mouth and lip to render the device in use, as comfortable as possible to the animal.

The flat inwardly directed portion of the side bar 4 is preferably pivoted at 15 substantially at the base of the arcuate shaped arm 10 to the flattened portion of the arm 5 adjacent one side of said projection 14 and apertures 16 and 17 are provided in the flattened portions on the arms 4 and 5 on the opposite side of said projection 14 to removably receive a fastening of any suitable character 18. This fastening may, if desired, be in the form of a cotter pin and in any event, the fastening is removable to permit pivotal movement of the bars and consequently the arcuate shaped arms to permit insertion of the knobs 11 and 13 into the calf's nostrils when the apertures 16 and 17 may be brought into registration to permit insertion of the fastening 18 so as to prevent accidental removal of the device from the animal's nostrils.

The fastenings 18 preferably has such relation to the apertures 16 and 17 as to permit slight play of the outer ends of the overlapping ends of the bars on each other so as not to pinch too tightly in one position in the nostril of the animal and yet such play is not intended to be so great as to permit of accidental dislocation of the device from the animal's nostril.

The device may be as readily removed as applied by removal of the fastening 18 and pivotal movement of the bars permitted with relation to each other on the pivot 15. The rings or links of the mesh material may be secured to the overlapping inwardly directed portions of the side bars, as shown without interfering with the aforesaid pivotal movement and without interfering with the application or removal of the fastening 18. In other words, the edge or border rings or links of the mesh material are of a size to slide freely on the bars at their overlapping portions and being of a size whereby pivotal movement of the bars is permitted The fastening 18 may be removed to permit sliding movement of a ring or link of the mesh material to opposite sides of the apertures 16 and 17 and in fact by including the adjacent ring or link. The fastening 18 may be positioned or removed through such ring or link of the mesh material.

The rear ends of the side bars 4 and 5 are provided with loops 19 and 20 respectively to which may be fastened in any suitable manner the ends of a nose strap 21.

From the foregoing, it will be seen that I provide a simple, inexpensive and effective device for the purpose of weaning the calf and yet permitting it to graze and that the device may be readily applied or removed and can be worn comfortably by the animal.

What is claimed is:

1. A device of the character described comprising relatively long side bars having their front ends overlapping and formed to provide nose engaging members between the bars and in the rear of the front ends of the bars, one of the bars being provided with a projection extending downwardly at substantially a right angle thereto for forming a guard for disposition over the upper lip of the animal, and mesh material suspended from the bars.

2. A device of the character described comprising side bars to extend along the sides of the nose of the animal and having their front ends overlapping, and projecting inwardly from their overlapping portions into arcuate shaped arms terminating in nose engaging members, said bars having pivotal connection, means for fastening the overlapping portions of the bars together, and mesh material suspended from the bars.

3. A device of the character described comprising side bars having their front ends overlapping and formed to provide nose engaging members between the bars in the rear of the overlapping portion thereof, the bars at their overlapping portions having a projection forming a guard for disposition over the upper lip of the animal, the overlapping portions of the bars being pivoted together, means for fastening the overlapping portions together to fasten the nose engaging members in the nose of the animal and yet permit slight play of the nose engaging members in the nostril of the animal, mesh material secured to the bars, and a nose strap secured to the inner ends of the bars to fit over the nose of the animal.

In testimony whereof I have hereunto set my hand.

ELISHA R. DAVIS.